E. A. HURD.
LIFTING HANDLE FOR STORAGE BATTERIES.
APPLICATION FILED MAR. 3, 1917.
1,349,457. Patented Aug. 10, 1920.
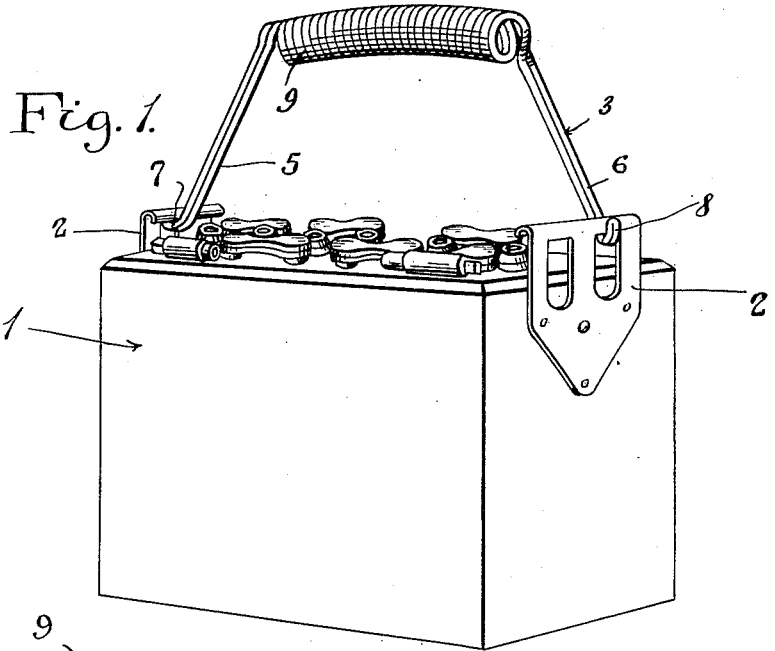
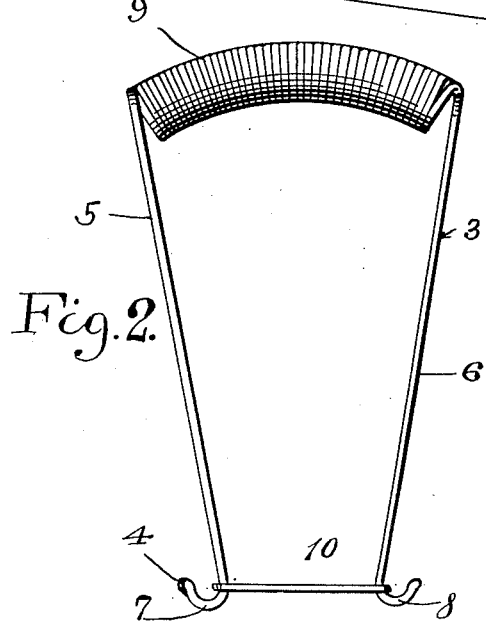
Witnesses
J. P. Wahler.
Robt Meyer.
Inventor
E. A. Hurd.
By [signature]
Attorney

UNITED STATES PATENT OFFICE.

ENOS A. HURD, OF WOODWARD, OKLAHOMA.

LIFTING-HANDLE FOR STORAGE BATTERIES.

1,349,457.   Specification of Letters Patent.   Patented Aug. 10, 1920.

Application filed March 3, 1917. Serial No. 152,367.

*To all whom it may concern:*

Be it known that I, ENOS A. HURD, a citizen of the United States, residing at Woodward, in the county of Woodward and State of Oklahoma, have invented certain new and useful Improvements in Lifting-Handles for Storage Batteries; and I do hereby declare the following to be a full, clear, and exact description of the invention, such as will enable others skilled in the art to which it appertains to make and use the same.

This invention relates to a handle which is particularly designed for lifting or raising storage batteries out of their seats in motor vehicles, and the primary object of the invention is to provide a handle of this nature which is extremely simple in construction, cheap to manufacture and which may be used in connection with storage batteries of any size without necessitating any alterations to the handle.

In various types of motor vehicles, the storage batteries are often placed in inaccessible positions, and due to the weight of the batteries, it is quite a hardship for a mechanic to remove one of the batteries for the purpose of recharging the same, or for any other purpose, and it is the object of this invention to provide a handle which may be connected to the handles of a storage battery so the mechanic may use one hand for removing a storage battery from its seat, if desired.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a perspective view of a storage battery, showing the improved handle attached thereto;

Fig. 2 is a side elevation of the handle in its inoperative position.

Referring more particularly to the drawings, 1 indicates an ordinary storage battery which has handles 2 attached to its ends. In Fig. 1 of the drawings, a particular type of storage battery and handles 2 are shown, but it is to be understood that the improved lifting handle may be used upon any type of storage battery of this nature, without departing from the spirit of this invention.

The improved lifting handle which is generically indicated by the numeral 3 is constructed of a single strand of wire, which is doubled, so that two lengths of the strand lie in parallel engaging relation with each other, as clearly shown in Fig. 1 of the drawings. The ends of the strand of wire are secured together in any suitable manner, such as by soldering as indicated at 4. The parallel lengths of the strand of wire are bent to form a pair of arms 5 and 6 which have their lower or free ends bent outwardly to form outwardly extending hooks 7 and 8 respectively. The outwardly bent hooks 7 and 8 are provided for extending through the openings in the handles 2 of the storage battery, for connecting the lifting handle structure 3 to the storage battery.

The parallel lengths of the strand of wire are coiled intermediate the upper ends of the legs or arms 5 and 6 to form a hand grip 9 which, when the arms are held in their inner inoperative positions by means of the strap 10, is curved so that immediately upon the removal of the strap 10 from about the hooked ends of the arms 5 and 6, the convolutions of the coiled hand grip portion 9 will force the arms 5 and 6 outwardly away from each other so that they will grip the handles 2 of the storage batteries.

In reducing the invention to practice, certain minor features of construction, combination and arrangement of parts may necessitate alterations to which the patentee is entitled, provided such alterations are comprehended within the scope of what is claimed.

What is claimed is:—

A detachable lifting handle for storage batteries of the class described constructed of a single strand of wire bent back upon itself to form a pair of parallel lengths comprising a pair of spaced arms, said lengths of wire being coiled intermediate said arms to form a cylindrical hand grip, the arms joining the hand grip at the upper portion of the end convolutions of the grip, said arms having their free ends curved outwardly and upwardly in opposite directions to form battery handle gripping hooks, the hand grip also forming an expansion spring for forcing the arms outwardly away from each other to hold the hooks in operative position and in engagement with the battery handle and permits the arms and hooks to engage batteries of various sizes.

In testimony whereof I affix my signature in presence of two witnesses.

ENOS A. HURD.

Witnesses:
 EUBEN SHELLHART,
 M. E. GREEN.